United States Patent
Lv et al.

(10) Patent No.: US 11,270,669 B2
(45) Date of Patent: Mar. 8, 2022

(54) RENDERING METHOD AND APPARATUS, ELECTRONIC DEVICE AND STORAGE MEDIUM

(71) Applicant: BAIDU ONLINE NETWORK TECHNOLOGY (BEIJING) CO., LTD, Beijing (CN)

(72) Inventors: Sheng Lv, Beijing (CN); Yuanhang Zhang, Beijing (CN); Yan Wang, Beijing (CN); Jie Wang, Beijing (CN); Hongwei Cao, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 0 days.

(21) Appl. No.: 16/877,122

(22) Filed: May 18, 2020

(65) Prior Publication Data
US 2021/0118409 A1     Apr. 22, 2021

(30) Foreign Application Priority Data
Oct. 21, 2019 (CN) .......................... 201911002616.1

(51) Int. Cl.
*G09G 5/36* (2006.01)
*G06F 16/953* (2019.01)

(52) U.S. Cl.
CPC ............. *G09G 5/36* (2013.01); *G06F 16/953* (2019.01); *G09G 2354/00* (2013.01)

(58) Field of Classification Search
None
See application file for complete search history.

(56) References Cited

U.S. PATENT DOCUMENTS

2014/0310611 A1* 10/2014 Lewin .................. G06F 3/0484
                                                    715/744
2015/0301989 A1* 10/2015 Xin ...................... G06F 40/109
                                                    715/234

(Continued)

FOREIGN PATENT DOCUMENTS

JP          2017-021400 A        1/2017

OTHER PUBLICATIONS

Japan Patent Office, Notice of Reasons for Refusal, mailed in relationship to Japanese Application No. 2020-087901, dated Jul. 16, 2021 (8 pages).

*Primary Examiner* — Yi Wang
(74) *Attorney, Agent, or Firm* — Polsinelli PC

(57) ABSTRACT

A rendering method and apparatus, an electronic device and a storage medium are provided, which relate to the field of artificial intelligence. In a specific implementation, the rendering method includes: acquiring a content to be rendered, a category of the content to be rendered, information on a device on which a rendered content is to be displayed, and information on a server providing the content to be rendered; determining information on a first rendering template according to the category of the content to be rendered, the information on the device, and the information on the server; searching for the first rendering template according to the information on the first rendering template; and rendering the content to be rendered with the first rendering template, in a case that the first rendering template is searched out. In the embodiments of the application, rendering is implemented flexibly and efficiently.

18 Claims, 5 Drawing Sheets

(56) References Cited

U.S. PATENT DOCUMENTS

| | | | |
|---|---|---|---|
| 2017/0011743 A1 | 1/2017 | Matsumoto et al. | |
| 2018/0217966 A1* | 8/2018 | Buttolo | G06F 16/951 |
| 2020/0410049 A1* | 12/2020 | Tripathi | G06F 40/106 |

* cited by examiner

RENDERING METHOD AND APPARATUS, ELECTRONIC DEVICE AND STORAGE MEDIUM

CROSS-REFERENCE TO RELATED APPLICATION

This application claims priority to Chinese Patent Application No. 201911002616.1, filed on Oct. 21, 2019, which is hereby incorporated by reference in its entirety.

TECHNICAL FIELD

The present application relates to the field of computer technology, and in particular, to the field of content rendering using artificial intelligence (AI).

BACKGROUND

When rendering display contents of an intelligent interactive device with a screen, the same contents to be rendered are usually rendered with a uniform rendering template in the existing technology, regardless of information such as display capabilities of the intelligent interactive device and characteristics of a server, so rendering could not be implemented flexibly and efficiently.

SUMMARY

A rendering method and apparatus, an electronic device and a storage medium are provided according to embodiments of the present application.

In a first aspect, a rendering method is provided according to an embodiment of the application, which includes:

acquiring a content to be rendered, a category of the content to be rendered, information on a device on which a rendered content is to be displayed, and information on a server providing the content to be rendered;

determining information on a first rendering template according to the category of the content to be rendered, the information on the device, and the information on the server; and searching for the first rendering template according to the information on the first rendering template, and rendering the content to be rendered with the first rendering template.

The rendering method according to the embodiment of the present application may search for the first rendering template according to the category of the content to be rendered, the information on the device, and the information on the server. In the case where the first rendering template is searched out, the content to be rendered is rendered with the first rendering template. As the information on the device and the information on the server are used as a basis for determining the first rendering template, a rendering template that matches capabilities of the device and characteristics of the server can be used for rendering, thereby achieving flexible and efficient rendering.

In an implementation, the above method further includes:

determining information on a second rendering template according to the information on the device and the information on the server, in a case that the first rendering template is not searched out; and searching for the second rendering template according to the information on the second rendering template, and rendering the content to be rendered with the second rendering template.

In an implementation, the above method further includes:

acquiring a third rendering template, and rendering the content to be rendered with the third rendering template, in a case that the second rendering template is not searched out.

In the embodiment of the application, in the case where the first rendering template is not searched out, the second rendering template that matches the information on the device and the information on the server may be searched for; in the case where the second rendering template is not searched out, a generic third rendering template may be searched for. Such a manner of determining a rendering template with matching conditions relaxed gradually achieves graceful degradation of the entire rendering process.

In an implementation, the information on the device includes a type of the device and a version of a rendering engine in the device.

In a second aspect, a rendering apparatus is provided according to an embodiment of the application, which includes:

an acquiring module, configured to acquire a content to be rendered, a category of the content to be rendered, information on a device on which a rendered content is to be displayed, and information on a server providing the content to be rendered;

a first determining module, configured to determine information on a first rendering template according to the category of the content to be rendered, the information on the device, and the information on the server; and a first rendering module, configured to search for the first rendering template according to the information on the first rendering template, and render the content to be rendered with the first rendering template.

In an implementation, the above rendering apparatus further includes:

a second determining module, configured to determine information on a second rendering template according to the information on the device and the information on the server, in a case that the first rendering template is not searched out; and a second rendering module, configured to search for the second rendering template according to the information on the second rendering template, and render the content to be rendered with the second rendering template.

In an implementation, the above rendering apparatus further includes:

a third rendering module, configured to acquire a third rendering template, and render the content to be rendered with the third rendering template, in a case that the second rendering template is not searched out.

In an implementation, the information on the device includes a type of the device and a version of a rendering engine in the device.

In a third aspect, an electronic device is provided according to an embodiment of the application, which includes:

at least one processor; and a memory communicatively connected with the at least one processor, wherein the memory stores instructions executable by the at least one processor, and the instructions, when executed by the at least one processor, cause the at least one processor to implement the method of any one of the embodiments of the present application.

In a fourth aspect, a non-transitory computer-readable storage medium storing computer instructions, wherein the computer instructions, when executed by a computer, causes the computer to implement the method of any one of the embodiments of the present application.

One embodiment of the above application has the following advantages or beneficial effects: the rendering method according to the embodiment of the present application may search for the first rendering template according to the category of the content to be rendered, the information on the device, and the information on the server. In the case where the first rendering template is searched out, the content to be rendered is rendered with the first rendering template, thereby achieving rendering that matches display capabilities of the device. In the case where the first rendering template is not searched out, the search conditions of the rendering template may be gradually relaxed to achieve graceful degradation of the entire rendering process.

Other effects of the foregoing optional manners will be described below in conjunction with specific embodiments.

BRIEF DESCRIPTION OF THE DRAWINGS

The drawings are used to better understand the solution, and do not constitute a limitation on the application, wherein.

DETAILED DESCRIPTION

With reference to the accompanying drawings, exemplary embodiments of the present application are described below, which include various details of the embodiments of the present application to facilitate understanding and should be considered as merely exemplary. Therefore, those ordinary skilled in the art should recognize that various changes and modifications can be made to the embodiments described herein without departing from the scope and spirit of the application. Also, for clarity and conciseness, the description for known functions and structures is omitted in the following description.

Figure 1:
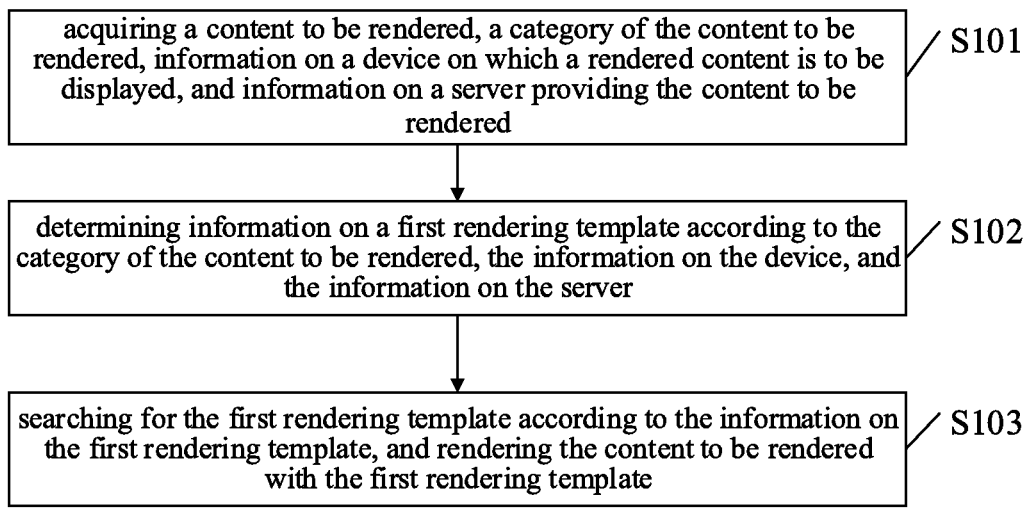
FIG. 1 is a first schematic flowchart of an implementation of a rendering method according to an embodiment of the present application.

A rendering method is provided according to an embodiment of the present application. FIG. 1 is a first schematic flowchart of an implementation of a rendering method according to an embodiment of the present application, which includes:

S101, acquiring a content to be rendered, a category of the content to be rendered, information on a device on which a rendered content is to be displayed, and information on a server providing the content to be rendered;

S102, determining information on a first rendering template according to the category of the content to be rendered, the information on the device, and the information on the server; and S103, searching for the first rendering template according to the information on the first rendering template, and rendering the content to be rendered with the first rendering template.

In a possible implementation, the information on the first rendering template is a search path for the first rendering template, and the first rendering template may be considered as a rendering template that matches conditions such as the server, the device, and the category of the content to be rendered.

Figure 2:
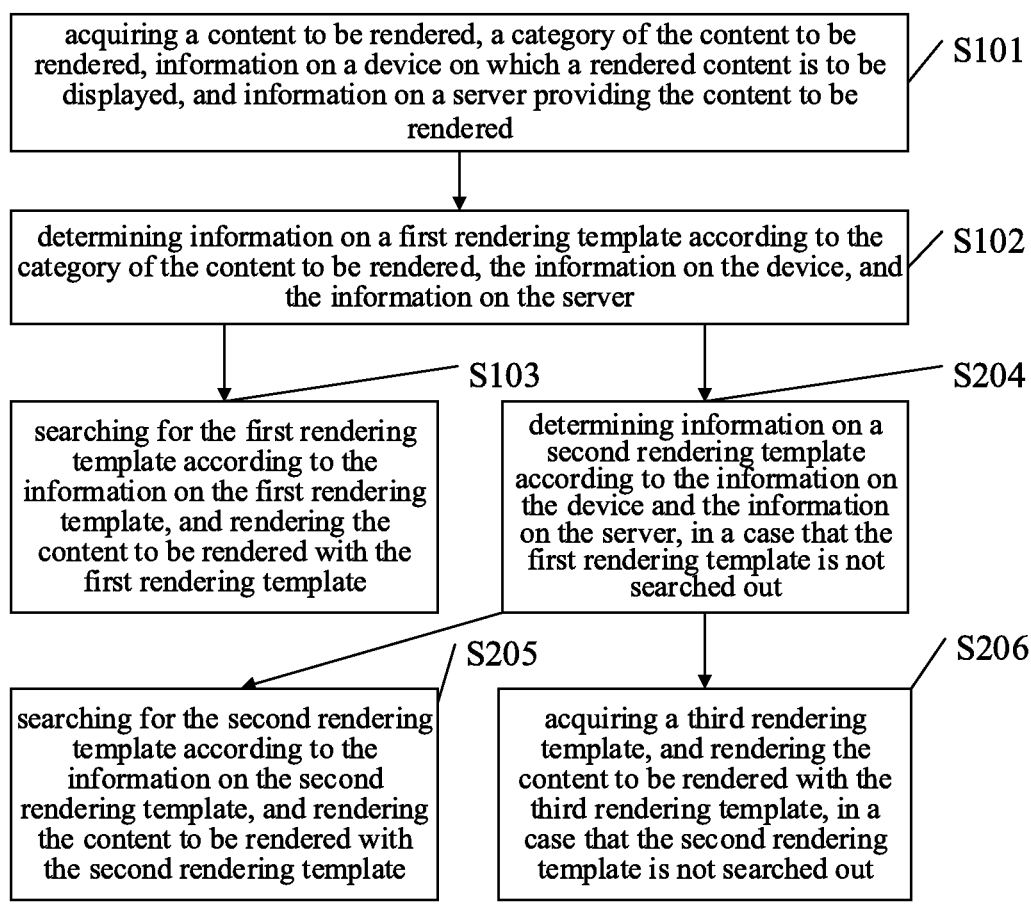
FIG. 2 is a second schematic flowchart of an implementation of a rendering method according to an embodiment of the present application.

FIG. 2 is a second schematic flowchart of an implementation of a rendering method according to an embodiment of the present application. As shown in FIG. 2, the rendering process may further include:

S204, determining information on a second rendering template according to the information on the device and the information on the server, in a case that the first rendering template is not searched out; and S205, searching for the second rendering template according to the information on the second rendering template, and rendering the content to be rendered with the second rendering template.

In a possible implementation, the information on the second rendering template is a search path for the second rendering template, and the second rendering template may be considered as a preset default template. In the case where a rendering template with conditional matching (i.e., the first rendering template) is not searched out, the content to be rendered is rendered with a default template in the embodiment of the present application.

The first rendering template or the second rendering template may refer to a group of rendering templates, and each group includes at least one rendering template.

As shown in FIG. 2, the rendering process in an embodiment of the present application may further include:

S206, acquiring a third rendering template, and rendering the content to be rendered with the third rendering template, in a case that the second rendering template is not searched out.

In a possible implementation, information on the third rendering template is a search path for the third rendering template, and the third rendering template may be considered as a reveal rendering template. In the case where a default template (i.e., the second rendering template) is not searched out, a reveal rendering template is used for rendering and an interface indicating an error may be displayed on a display interface in the embodiment of the present application.

The above search conditions are from accurate to less accurate; the rendering templates that are searched out are from conditional matching to default matching, and then from default matching to mismatching. This selection process with the conditions relaxed gradually reflects graceful degradation of the entire rendering process.

Figure 3:
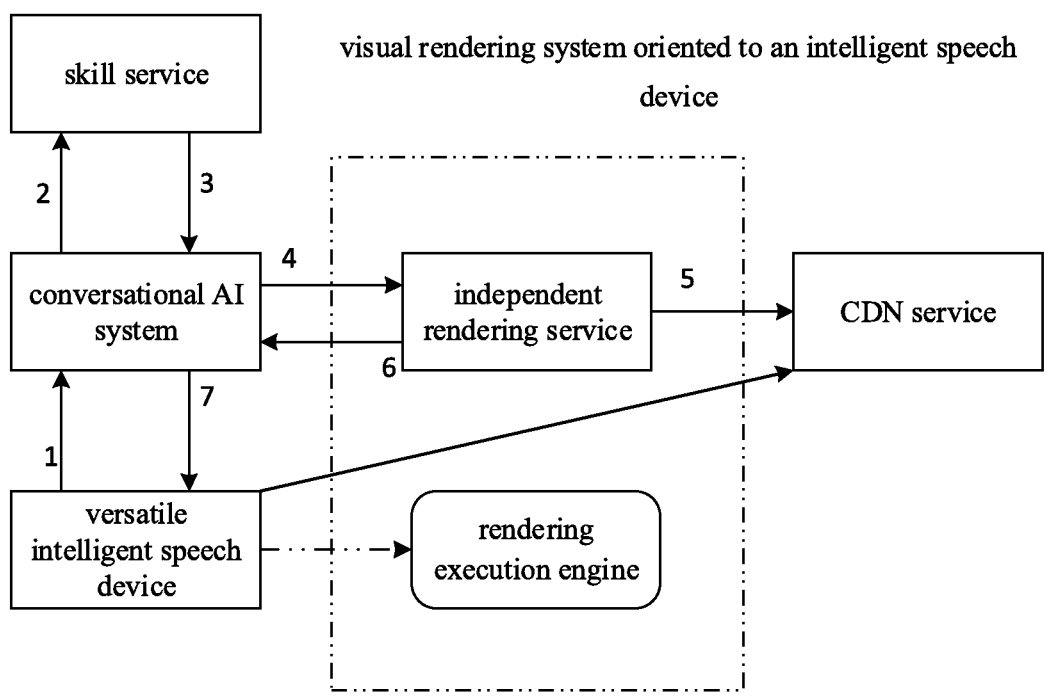
FIG. 3 is a schematic diagram of a structure and information flow of a system where an independent rendering server is located, according to an embodiment of the present application.

The rendering method according to an embodiment of the present application may be executed by an independent rendering server. FIG. 3 is a schematic diagram of a structure and information flow of a system where an independent rendering server is located, according to an embodiment of the present application. The system may be a visual rendering system oriented to an intelligent speech device. The rendering system may include a skill service, a conversational AI system, an independent rendering service, a content delivery network (CDN) service, an intelligent speech device, and the like. In the system shown in FIG. 3, an overall process is as follows.

1) A user inquires an intelligent speech device through a speech, and the intelligent speech device transmits the user's inquiry to the conversational AI system. The intelligent speech device is the device in the foregoing embodiment. The device may have a screen.

2) After processing by Automatic Speech Recognition (ASR) and Natural Language Understanding (NLU), the conversational AI system transmits an intent to the skill service. The skill service is the server providing the content to be rendered in the above embodiments.

3) The skill service returns the content to be rendered to the conversational AI system, and the content to be rendered may include the content and resources.

4) The conversational AI system transmits the content to be rendered, the information on the intelligent speech device, and the information on the skill service to the independent rendering server.

5) The independent rendering service transmits static data in the content to be rendered to the CDN service.

6) The independent rendering service selects a rendering template suitable for the intelligent speech device based on the content received in step 4), renders the content to be rendered with the selected rendering template to generate a target code that may be easily executed by the intelligent speech device, and returns the target code to the conversational AI system.

7) The conversational AI system returns data such as the received target code and the related context information to the intelligent speech device.

8) The above target code is executed by a rendering execution engine in the intelligent speech device and displayed on the screen. Static resources in the content to be rendered may be pulled directly from the CDN by the intelligent speech device.

The rendering method according to an embodiment of the present application may be used to solve steps 4) and 6) in the above process.

Figure 4:
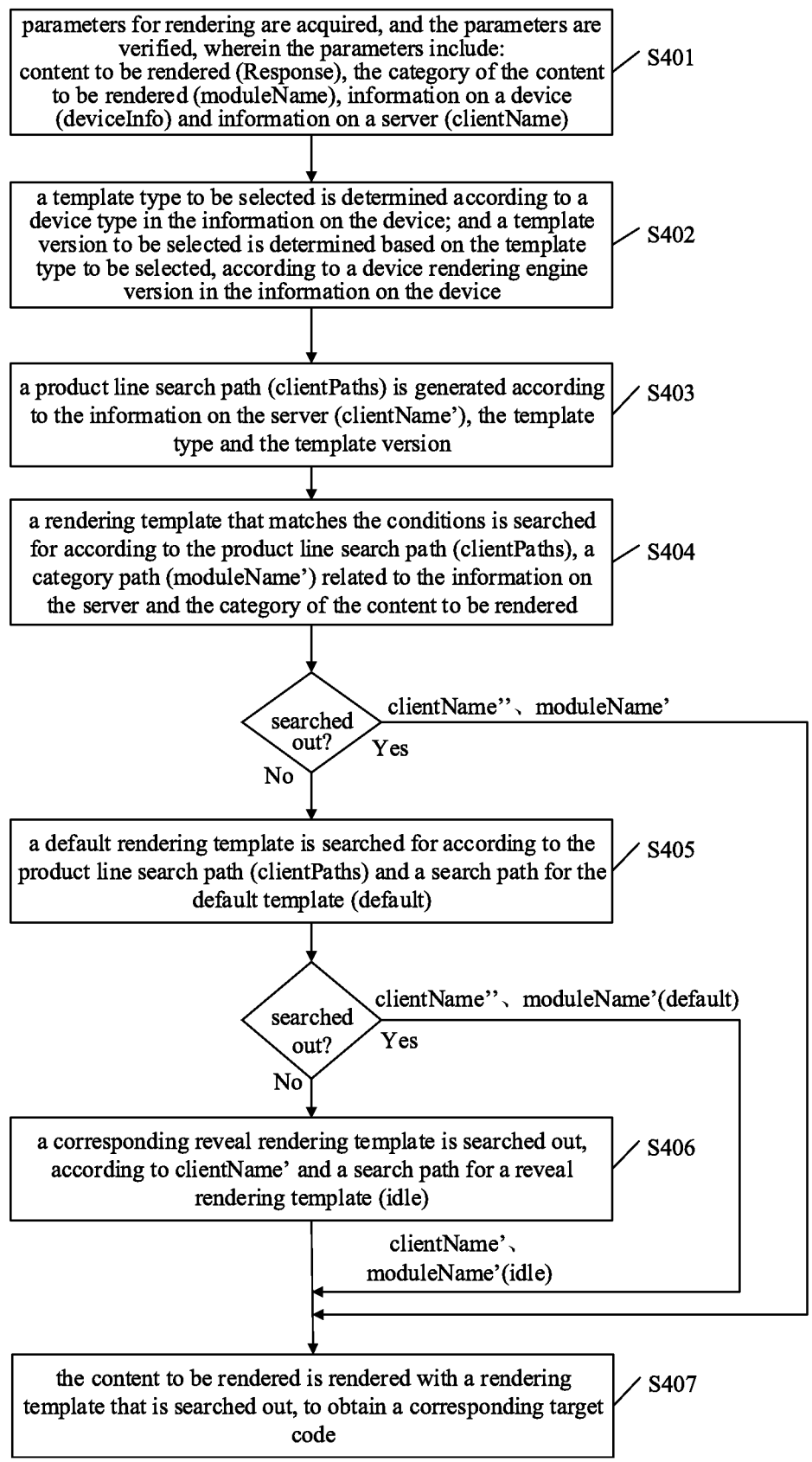
FIG. 4 is a third schematic flowchart of an implementation of a rendering method according to an embodiment of the present application.

FIG. 4 is a third flow chart of an implementation of a rendering method according to an embodiment of the present application.

In S401, parameters for rendering are acquired, and the parameters are verified. For example, the parameters include:

response, for representing the content to be rendered;

moduleName, for representing the category of the content to be rendered, such as graphic, plain text, audio or video;

deviceInfo, for representing the information on the device; and clientName, for representing the information on the server, such as a name of the skill service, and an identity requested in the skill service.

The content to be rendered, the information on the device, and the information on the server may be received from the conversational AI system in FIG. 3 described above. The category of the content to be rendered may be received from the conversational AI system, or be obtained through analysis on the content to be rendered by the independent rendering server.

In S402, a template type to be selected is determined according to a device type in the information on the device; and a template version to be selected is determined based on the template type to be selected, according to a device rendering engine version in the information on the device.

In S403, a product line search path is generated according to the information on the server, the template type, and the template version. The information on the server may be represented by clientName', which is obtained by transforming the above-mentioned clientName with a fixed mapping relation. The product line search path may be represented by clientPaths, which indicates a search path for a rendering template that matches the information on the device and the information on the server.

In S404, a rendering template that matches the conditions is searched for according to the product line search path and a category path related to the information on the server and the category of the content to be rendered. In a case that a corresponding rendering template is searched out, clientName' is transformed with a fixed mapping relation to obtain clientName", and then S407 is executed using clientName' and the category path related to the information on the server and the category of the content to be rendered; otherwise, S405 is executed. The category path may be represented by moduleName'.

In S405, a default rendering template is searched for according to the product line search path (clientPaths) and a search path for the default template. In a case that a corresponding default rendering template is searched out, the search path for the default rendering template is carried in a parameter of moduleName'; and clientName' is transformed with a fixed mapping relation to obtain clientName", and then S407 is executed using the parameters of clientName" and moduleName'; otherwise, S406 is executed. The search path for the default rendering template may be represented by "default".

In S406, a corresponding reveal rendering template is searched out, according to clientName' and a search path for a reveal rendering template, and then S407 is executed. The search path for the reveal rendering template may be carried in the parameter of moduleName', and then S407 is executed using the parameters of clientName' and moduleName'. The search path for the reveal rendering template may be represented by "idle".

In S407, the content to be rendered is rendered with a rendering template that is searched out, to obtain a corresponding target code.

After the target code is obtained, the above target code may be returned to the conversational AI system in an embodiment of the present application. In the above process, the rendering template searched out in S404 may refer to the first rendering template in the embodiments shown in FIGS. 1 and 2, and the default rendering template searched out in S405 may refer to the second rendering template in the embodiment shown in FIG. 2. The reveal rendering template searched out in S406 may refer to the third rendering template in the embodiment shown in FIG. 2.

In embodiments of the present application, different rendering templates may be set in advance. For example, according to the type of the device, the rendering templates may be classified into rendering templates suitable for an intelligent speech device with a screen and rendering templates suitable for an intelligent TV. The rendering templates suitable for the intelligent speech device may be classified into static templates, theme templates, and common version templates. For example, the static templates may include error reveal page templates, branch theme templates, conversational AI operating system display language templates, third-party skill templates, general information presentation templates, text to speech (TTS) screen reveal page templates, content square templates, task center templates, templates with custom template types. The theme templates may include display theme templates. The rendering templates suitable for an intelligent TV may include error reveal page templates, third-party skill generic templates, third-party skill payment and authorization page templates, recipe cooking step templates, and the like.

The rendering template in the embodiments of the present application defines page rendering of a certain resource on the device of a specific version. Therefore, which rendering should be used for the content to be rendered as requested by a user at some time is related to many factors. In the embodiments of the present application, the relation between the rendering template and the resources is 1:N, wherein N is a positive integer. That is, different resources are allowed to be rendered and displayed with the same rendering template. A rendering template is selected depending on a rendering execution engine in the device. That is, a rendering template developed based on a rendering execution engine with a higher version may not necessarily support a device installed with a rendering execution engine with a lower version. Therefore, version control is required to be performed in the cloud. In addition, the rendering template in the embodiments of the present application may be adaptive according to a screen of the device.

The rendering template according to the embodiments of the present application is a combination technology about display elements. Through effective use and reasonable layout for basic display elements, presentations on different devices are implemented in the form of "pages", thereby achieving fast response of display.

Figure 5:
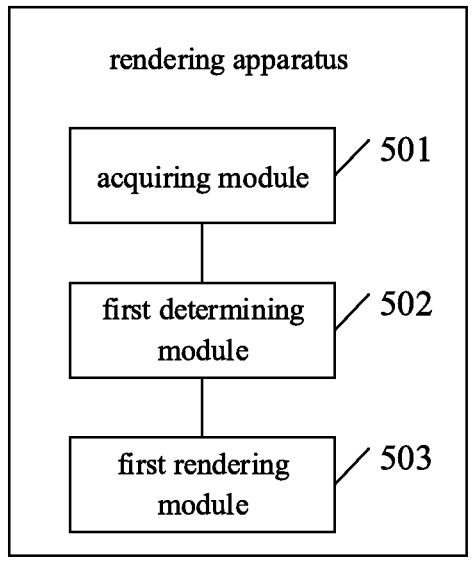
FIG. 5 is a first schematic structural diagram of a rendering apparatus according to an embodiment of the present application.

A rendering apparatus is provided according to an embodiment of the present application. FIG. 5 is a first schematic structural diagram of a rendering apparatus according to an embodiment of the present application, which includes:

an acquiring module 501, configured to acquire a content to be rendered, a category of the content to be rendered, information on a device on which a rendered content is to be displayed, and information on a server providing the content to be rendered;

a first determining module 502, configured to determine information on a first rendering template according to the category of the content to be rendered, the information on the device, and the information on the server; and a first rendering module 503, configured to search for the first rendering template according to the information on the first rendering template, and render the content to be rendered with the first rendering template.

Figure 6:
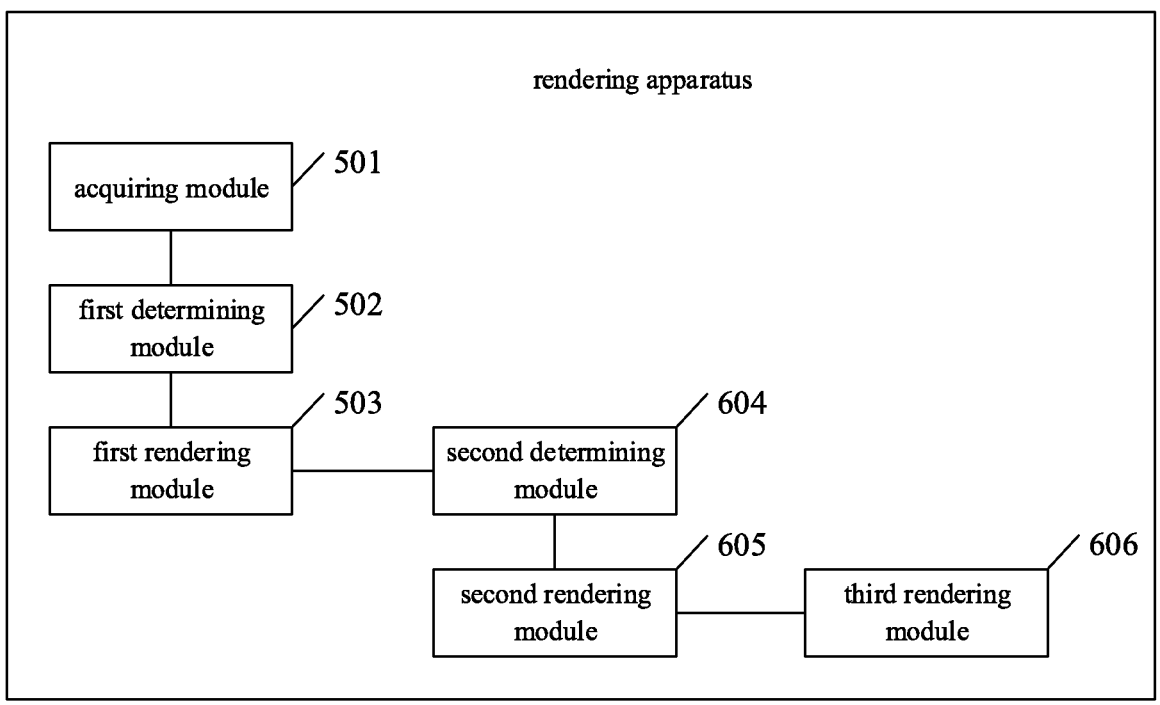
FIG. 6 is a second schematic structural diagram of a rendering apparatus according to an embodiment of the present application.

FIG. 6 is a second schematic structural diagram of a rendering apparatus according to an embodiment of the present application. As shown in FIG. 6, the above apparatus may further includes:

a second determining module 604, configured to determine information on a second rendering template according to the information on the device and the information on the server, in a case that the first rendering template is not searched out;

a second rendering module 605, configured to search for the second rendering template according to the information on the second rendering template, and render the content to be rendered with the second rendering template; and a third rendering module 606, configured to acquire a third rendering template, and render the content to be rendered with the third rendering template, in a case that the second rendering template is not searched out.

In a possible implementation, the information on the device includes a type of the device and a version of a rendering engine in the device.

The functions of modules in the apparatus of the embodiment of the application may refer to the corresponding description in the above method, and will not be reiterated here.

An electronic device and a readable storage medium are provided according to embodiments of the present application.

Figure 7:
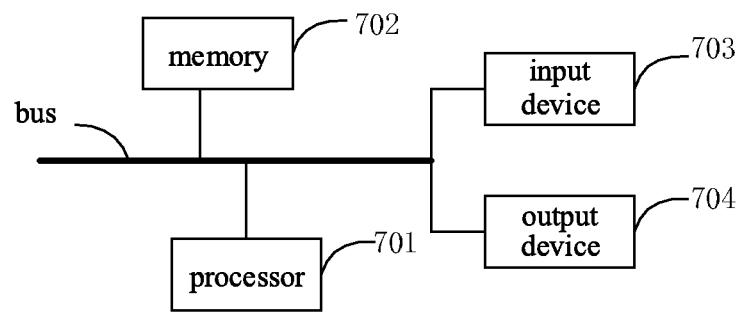
FIG. 7 is a block diagram of an electronic device for implementing a rendering method according to an embodiment of the present application.

FIG. 7 shows a block diagram of an electronic device for implementing a rendering method according to an embodiment of the present application. Electronic devices are intended to represent various forms of digital computers, such as laptop computers, desktop computers, workbenches, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown here, their connections and relationships, and their functions are merely examples, and are not intended to limit the implementation of the application described and/or required herein.

As shown in FIG. 7, the electronic device includes: one or more processors 701, a memory 702, and interfaces for connecting various components, including a high-speed interface and a low-speed interface. The various components are interconnected using different buses and may be mounted on a common motherboard or otherwise installed as required. The processor may process instructions executed within the electronic device, including instructions storing in or on a memory for displaying graphic information of a graphical user interface (GUI) on an external input/output device (such as a display device coupled to the interface). In other embodiments, multiple processors and/or multiple buses can be used with multiple memories, if desired. Similarly, multiple electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to an embodiment of the present application. The memory stores instructions executable by at least one processor, and the instructions, when executed by the at least one processor, cause the at least one processor to implement the rendering method according to the above embodiments of the present application. The non-transitory computer-readable storage medium of the present application stores computer instructions, wherein the computer instructions, when executed by a computer, cause the computer to implement the rendering method according to the above embodiments of the present application.

As a non-transitory computer-readable storage medium, the memory 702 may be used to store non-transitory software programs, non-transitory computer executable programs and modules, such as program instructions/modules corresponding to the rendering method in the embodiments of the present application (for example, the acquiring module 501, the first determining module 502, and the first rendering module 503 shown in FIG. 5). The processor 701 executes various functional applications and data processing of the server by running non-transitory software programs, instructions, and modules stored in the memory 702, that is, the rendering method according to the above embodiments of the present application can be implemented.

The memory 702 may include a storage program area and a storage data area, where the storage program area may store an operating system and an application program required for at least one function; the storage data area may store data created according to the use of the electronic device for rendering, etc. In addition, the memory 702 may include a high-speed random access memory, and may also include a non-transitory memory, such as at least one magnetic disk storage device, a flash memory device, or another non-transitory solid-state storage device. In some embodiments, the memory 702 may optionally include a memory remotely set relative to the processor 701, and these remote memories may be connected to the electronic device for rendering through a network. Examples of the above network include, but are not limited to, the Internet, an intranet, a local area network, a mobile communication network, and combinations thereof.

The electronic device for rendering may further include an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for rendering, such as a touch screen, a keypad, a mouse, a trackpad, a touchpad, a pointing stick, one or more mouse buttons, a trackball, a joystick and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the system and technology described herein can be implemented in a digital electronic circuit system, an integrated circuit system, an application specific integrated circuits (ASIC), a computer hardware, a firmware, a software, and/or a combination thereof. These various implementations may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, softwares, software applications, or codes) include machine instructions of a programmable processor and can be implemented using high-level procedural and/or object-oriented programming languages, and/or assembly/machine languages. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide interaction with the user, the system and technique described herein may be implemented on a computer having a display device (for example, a Cathode Ray Tube (CRT) or liquid crystal display (LCD) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The system and technology described herein can be implemented in a computing system including background components (for example, as a data server), or a computing system including middleware components (for example, an application server), or a computing system including front-end components (for example, a user computer with a graphical user interface or a web browser, through which the user can interact with the implementation of the system and technology described herein), or a computing system including any combination of such background components, middleware components, and front-end components. The components of the system may be interconnected by any form or medium of digital data communication (for example, a communication network). Examples of the communication network include: a local area network (LAN), a wide area network (WAN), and the Internet.

The computer system may include a client and a server. The client and server are generally remote from each other and typically interact through a communication network. A client-server relationship is generated by computer programs running on the respective computers and having the client-server relationship with each other.

According to the technical solution of the embodiments in the present application, a matched first rendering template may be searched for according to a category of the content to be rendered, information on a device, and information on a server. In the case where the first rendering template is searched out, the content to be rendered is rendered with the first rendering template, which achieves rendering that matches display capabilities of the device. In the case where the first rendering template is not searched out, the search conditions of the rendering template may be gradually relaxed to achieve graceful degradation of the entire rendering process.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein. The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed:
1. A rendering method, comprising:
  acquiring a content to be rendered, a category of the content to be rendered, information on a device on which a rendered content is to be displayed, and information on a server providing the content to be rendered;

determining information on a first rendering template according to the category of the content to be rendered, the information on the device, and the information on the server; and searching for the first rendering template according to a product line search path and the information on the first rendering template, wherein the product line search path is generated according to the information on the server, a template type, and a template version, and rendering the content to be rendered with the first rendering template.

2. The rendering method according to claim 1, further comprising:

determining information on a second rendering template according to the information on the device and the information on the server, in a case that the first rendering template is not searched out; and searching for the second rendering template according to the information on the second rendering template, and rendering the content to be rendered with the second rendering template.

3. The rendering method according to claim 2, further comprising:

acquiring a third rendering template, and rendering the content to be rendered with the third rendering template, in a case that the second rendering template is not searched out.

4. The rendering method according to claim 3, wherein the information on the device comprises a type of the device and a version of a rendering engine in the device.

5. The rendering method according to claim 2, wherein the information on the device comprises a type of the device and a version of a rendering engine in the device.

6. The rendering method according to claim 1, wherein the information on the device comprises a type of the device and a version of a rendering engine in the device.

7. A rendering apparatus, comprising:

one or more processors; and a storage device configured to store one or more programs, wherein the one or more programs, when executed by the one or more processors, cause the one or more processors to:

acquire a content to be rendered, a category of the content to be rendered, information on a device on which a rendered content is to be displayed, and information on a server providing the content to be rendered;

determine information on a first rendering template according to the category of the content to be rendered, the information on the device, and the information on the server; and search for the first rendering template according to a product line search path and the information on the first rendering template, wherein the product line search path is generated according to the information on the server, a template type, and a template version, and render the content to be rendered with the first rendering template.

8. The rendering apparatus according to claim 7, wherein the one or more programs, when executed by the one or more processors, cause the one or more processors further to:

determine information on a second rendering template according to the information on the device and the information on the server, in a case that the first rendering template is not searched out; and search for the second rendering template according to the information on the second rendering template, and render the content to be rendered with the second rendering template.

9. The rendering apparatus according to claim 8, wherein the one or more programs, when executed by the one or more processors, cause the one or more processors further to:

acquire a third rendering template, and render the content to be rendered with the third rendering template, in a case that the second rendering template is not searched out.

10. The rendering apparatus according to claim 9, wherein the information on the device comprises a type of the device and a version of a rendering engine in the device.

11. The rendering apparatus according to claim 8, wherein the information on the device comprises a type of the device and a version of a rendering engine in the device.

12. The rendering apparatus according to claim 7, wherein the information on the device comprises a type of the device and a version of a rendering engine in the device.

13. A non-transitory computer-readable storage medium storing computer instructions, wherein the computer instructions, when executed by a computer, cause the computer to:

acquire a content to be rendered, a category of the content to be rendered, information on a device on which a rendered content is to be displayed, and information on a server providing the content to be rendered;

determine information on a first rendering template according to the category of the content to be rendered, the information on the device, and the information on the server; and search for the first rendering template according to a product line search path and the information on the first rendering template, wherein the product line search path is generated according to the information on the server, a template type, and a template version, and render the content to be rendered with the first rendering template.

14. The non-transitory computer-readable storage medium according to claim 13, wherein the computer instructions, when executed by the computer, cause the computer further to:

determine information on a second rendering template according to the information on the device and the information on the server, in a case that the first rendering template is not searched out; and search for the second rendering template according to the information on the second rendering template, and render the content to be rendered with the second rendering template.

15. The non-transitory computer-readable storage medium according to claim 14, wherein the computer instructions, when executed by the computer, cause the computer further to:

acquire a third rendering template, and render the content to be rendered with the third rendering template, in a case that the second rendering template is not searched out.

16. The non-transitory computer-readable storage medium according to claim 15, wherein the information on the device comprises a type of the device and a version of a rendering engine in the device.

17. The non-transitory computer-readable storage medium according to claim 14, wherein the information on the device comprises a type of the device and a version of a rendering engine in the device.

18. The non-transitory computer-readable storage medium according to claim 13, wherein the information on the device comprises a type of the device and a version of a rendering engine in the device.

\* \* \* \* \*